United States Patent
Purves

(10) Patent No.: US 10,839,381 B2
(45) Date of Patent: *Nov. 17, 2020

(54) AUGMENTED SMART TAG SECURITY APPARATUSES, METHODS AND SYSTEMS

(71) Applicant: VISA INTERNATIONAL SERVICE ASSOCIATION, San Francisco, CA (US)

(72) Inventor: Thomas Purves, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,187

(22) Filed: Nov. 6, 2019

(65) Prior Publication Data

US 2020/0074462 A1    Mar. 5, 2020

Related U.S. Application Data

(63) Continuation of application No. 16/399,662, filed on Apr. 30, 2019, now Pat. No. 10,528,942, which is a continuation of application No. 15/784,906, filed on Oct. 16, 2017, now Pat. No. 10,325,255, which is a continuation of application No. 14/329,270, filed on Jul. 11, 2014, now Pat. No. 9,824,352.

(60) Provisional application No. 61/845,205, filed on Jul. 11, 2013.

(51) Int. Cl.
*G06Q 20/38* (2012.01)

(52) U.S. Cl.
CPC ....... *G06Q 20/3821* (2013.01); *G06Q 20/382* (2013.01)

(58) Field of Classification Search
CPC .......... G06K 15/00; G06K 19/00; G06K 7/10; G06K 9/18; G06F 17/00
USPC .............. 235/383, 375, 487, 462.01, 462.09; 705/5, 13
See application file for complete search history.

(56) References Cited

U.S. PATENT DOCUMENTS

| | | |
|---|---|---|
| 2009/0158302 A1 | 6/2009 | Nicodemus |
| 2009/0288012 A1 | 11/2009 | Hertel |
| 2012/0278142 A1 | 11/2012 | Li |
| 2013/0219479 A1 | 8/2013 | Desoto |
| 2013/0301870 A1 | 11/2013 | Mow |
| 2014/0337973 A1* | 11/2014 | Foster ..................... H04L 63/14 726/22 |

(Continued)

OTHER PUBLICATIONS

Notice of Allowance dated Feb. 7, 2019 for U.S. Appl. No. 15/784,906 (pp. 1-8).

(Continued)

*Primary Examiner* — Edwyn Labaze
(74) *Attorney, Agent, or Firm* — Loeb & Loeb LLP

(57) ABSTRACT

A method comprising receiving file captured by the mobile device, determining a file format of the captured file, and extracting contextual data from the captured file. The method includes querying a data source associated with a reference and receiving validation information regarding the contextual data. The method includes generating and transmitting a message based on the validation information for use in determining whether to allow the mobile device to interact with an endpoint corresponding to the reference.

20 Claims, 8 Drawing Sheets

(56) References Cited

U.S. PATENT DOCUMENTS

| | | | |
|---|---|---|---|
| 2014/0365776 A1 | 12/2014 | Smets | |
| 2014/0378204 A1 | 12/2014 | Michel | |
| 2015/0011309 A1 | 1/2015 | Eloff | |
| 2016/0099963 A1 | 4/2016 | Mahaffey | |
| 2016/0171486 A1 | 6/2016 | Wagner | |
| 2016/0246892 A1 | 8/2016 | Murrah | |
| 2017/0230402 A1* | 8/2017 | Greenspan | .......... H04L 63/1433 |

OTHER PUBLICATIONS

Office Action dated May 22, 2019 for U.S. Appl. No. 16/399,662 (pp. 1-6).

Office Action dated Oct. 4, 2018 for U.S. Appl. No. 15/784,906 (pp. 1-10).

* cited by examiner

Example: NFC/QR/RFID verification

Example: POS terminal verification

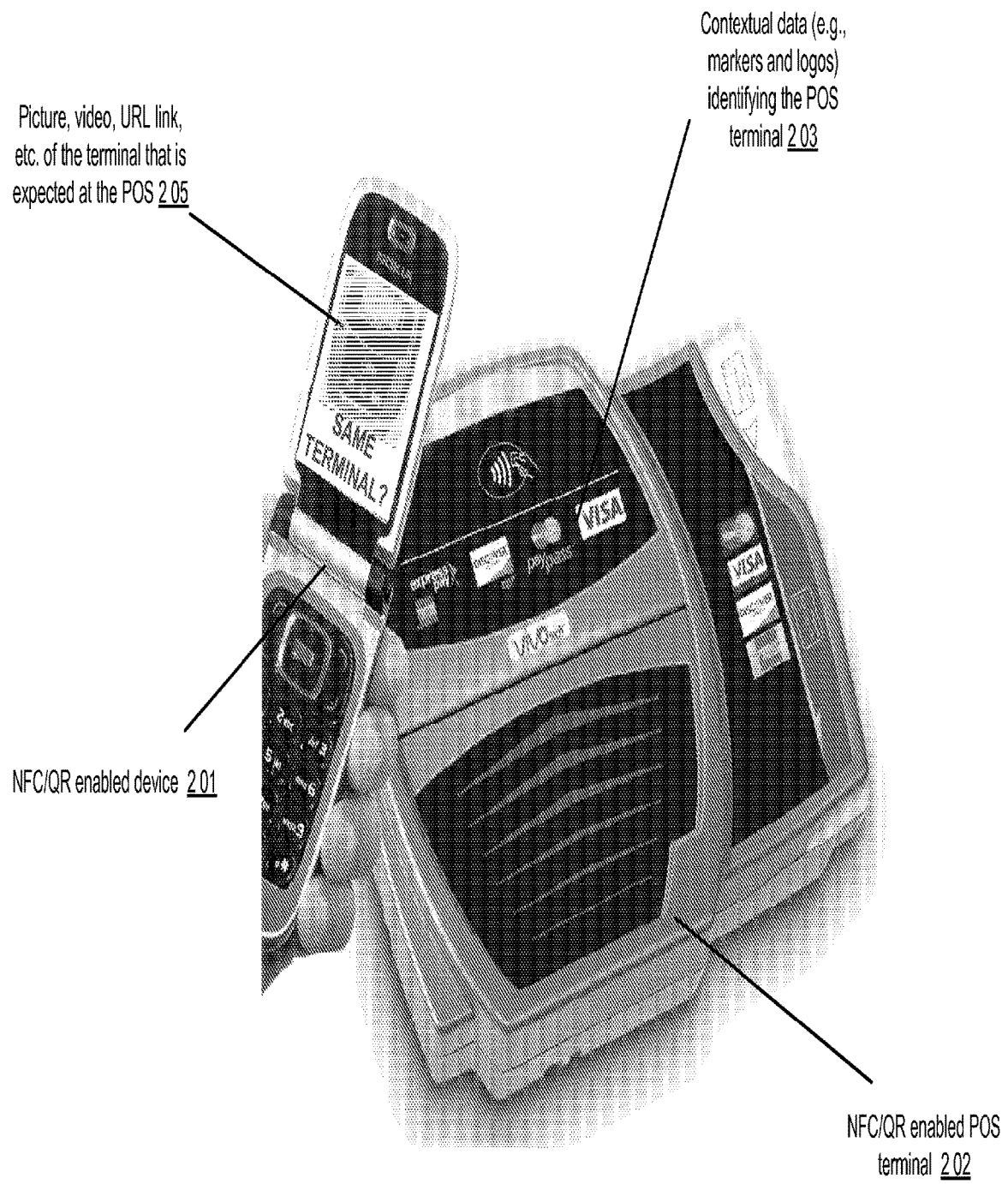
Figure 2B — Example: POS terminal verification

Example Datagraph: NFC tag/QR code contextual informations verification

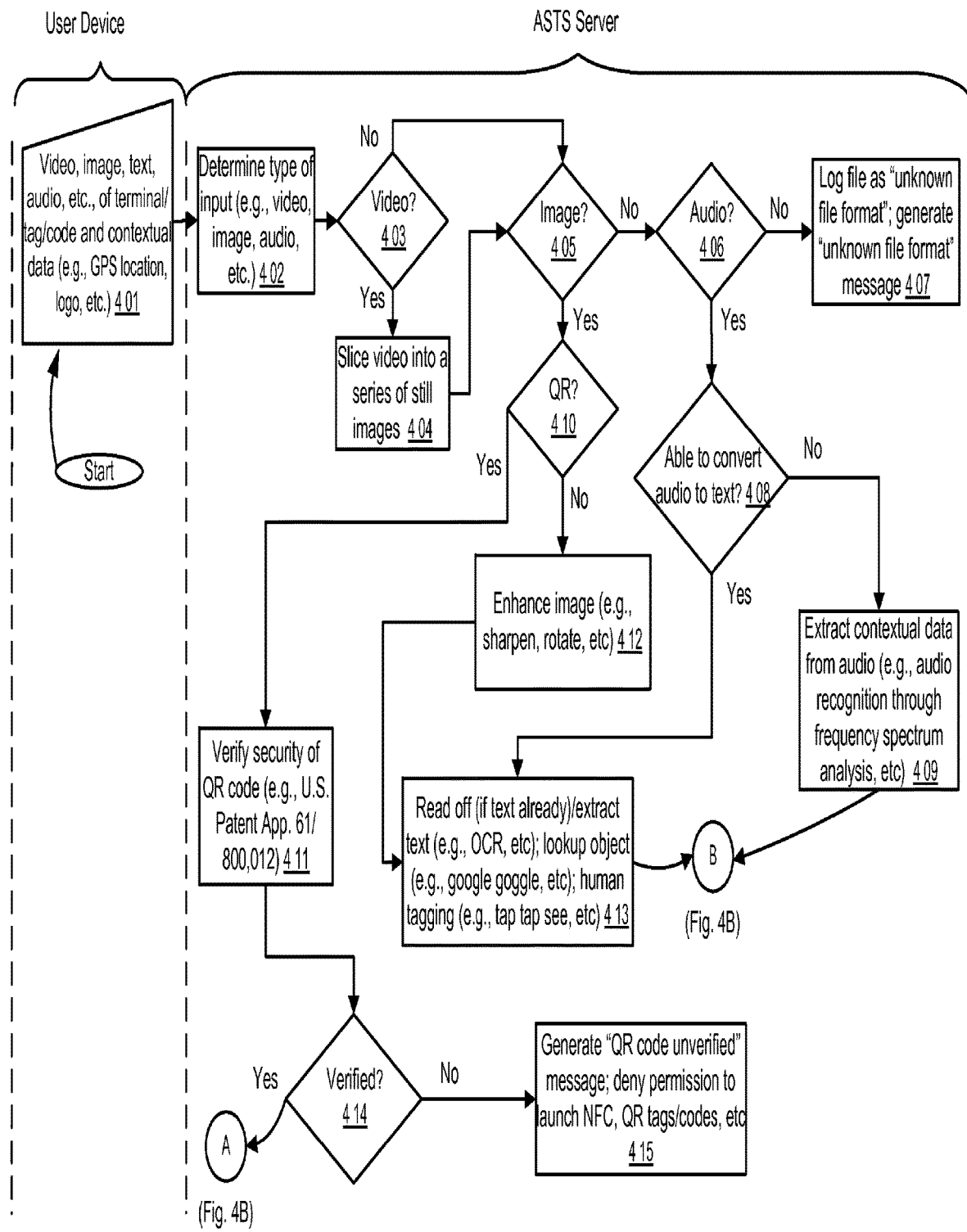
Figure 4A — Example Logic Flow

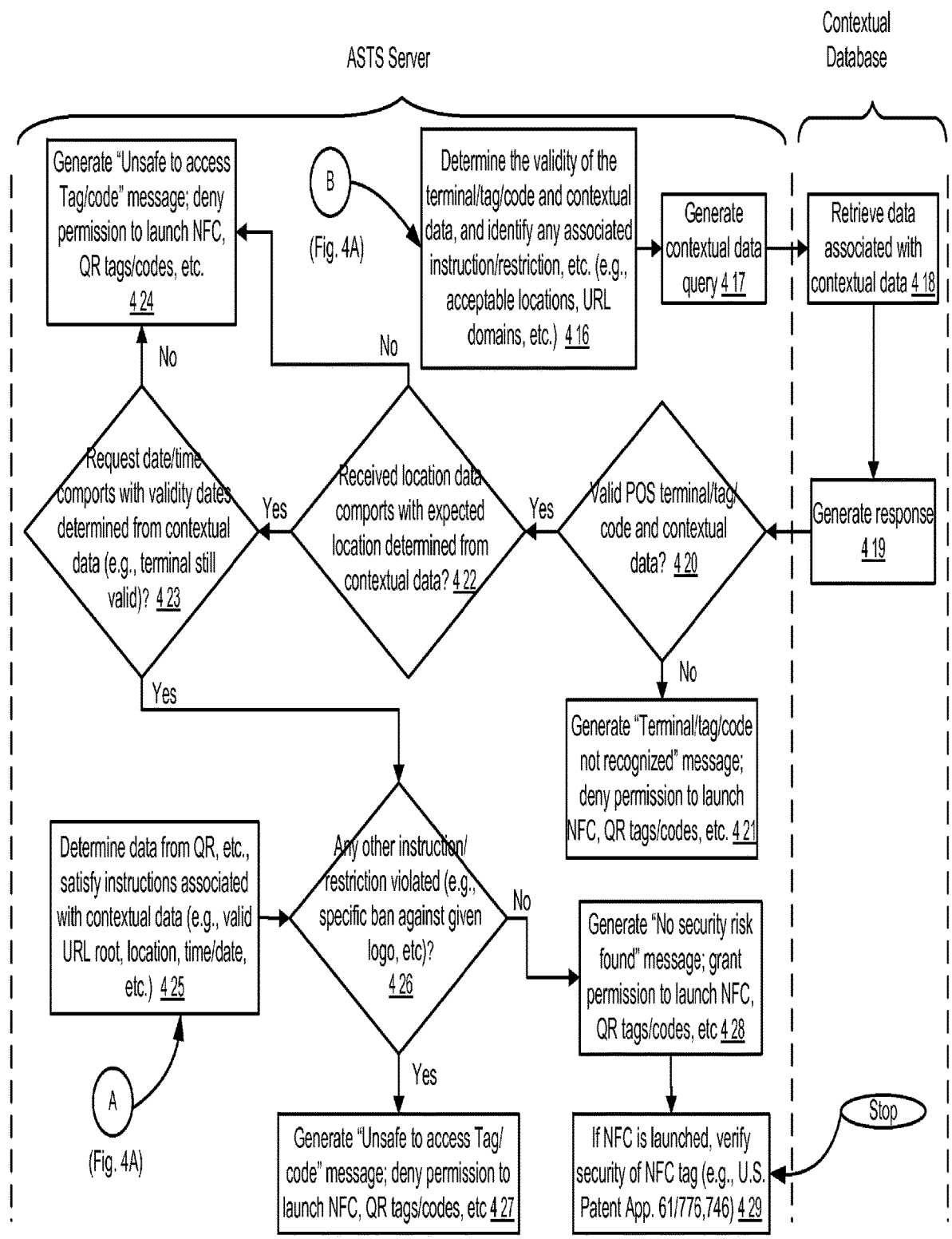
Figure 4B — Example Logic Flow

AUGMENTED SMART TAG SECURITY APPARATUSES, METHODS AND SYSTEMS

PRIORITY CLAIMS

This application is a continuation of U.S. non-provisional application Ser. No. 16/399,662, filed Apr. 30, 2019, which is a continuation of U.S. non-provisional Ser. No. 15/784,906, filed Oct. 16, 2017, now U.S. Pat. No. 10,325,255, which is a continuation of U.S. non-provisional application Ser. No. 14/329,270, filed Jul. 11, 2014, now U.S. Pat. No. 9,824,352, which claims priority to U.S. provisional patent application Ser. No. 61/845,205, filed Jul. 11, 2013. The aforementioned documents are hereby expressly incorporated by reference for all purposes.

This patent for letters patent document discloses and describes various novel innovations and inventive aspects of AUGMENTED SMART TAG SECURITY technology (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address apparatuses, methods, and systems for security verification of smart tags/codes, and more particularly, include AUGMENTED SMART TAG SECURITY APPARATUSES, METHODS AND SYSTEMS ("ASTS").

BACKGROUND

Near field communication (NFC) tags, radio-frequency identification device (RFID) tags, Quick Response (QR) codes, and barcodes provide ways to store data. NFC and RFID tags transmit the stored data via wireless radio communication to nearby NFC or RFID readers. QR codes and conventional barcodes, on the other hand, are optical labels that can be read and interpreted by machine readers/scanners. At merchants' contactless point of sale (POS) terminals, consumers may use their electronic devices to supply payment information (e.g., credit card number) wirelessly.

BRIEF DESCRIPTION OF THE DRAWINGS

The accompanying appendices, drawings, figures, images, etc., illustrate various non-limiting exemplary inventive aspects, embodiments, and features in accordance with the present disclosure:

FIGS. 1, 2A-B show block diagrams illustrating examples of the ASTS providing pre-launch security before interacting with NFC tags, QR codes, POS terminals, etc.;

FIGS. 4A-B show logic flow diagrams illustrating examples of transforming video and other media inputs of POS terminals/tags/codes and associated contextual data, via a ASTS component, into ways to validate the POS security, and into instructions/restrictions regulating access to and action on the data stored in the tags and codes.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Augmented Smart Tag Security (ASTS)

The AUGUMENTED SMART TAG SECURITY APPARATUSES, METHODS AND SYSTEMS (hereinafter "ASTS") transform video and other media inputs of POS terminals, NFC/RFID tags, QR/bar codes, and/or any associated contextual data, via ASTS components, into ways to validate the POS security and instructions/restrictions regulating access to and action on the data stored in the tags and codes.

Figure 1:
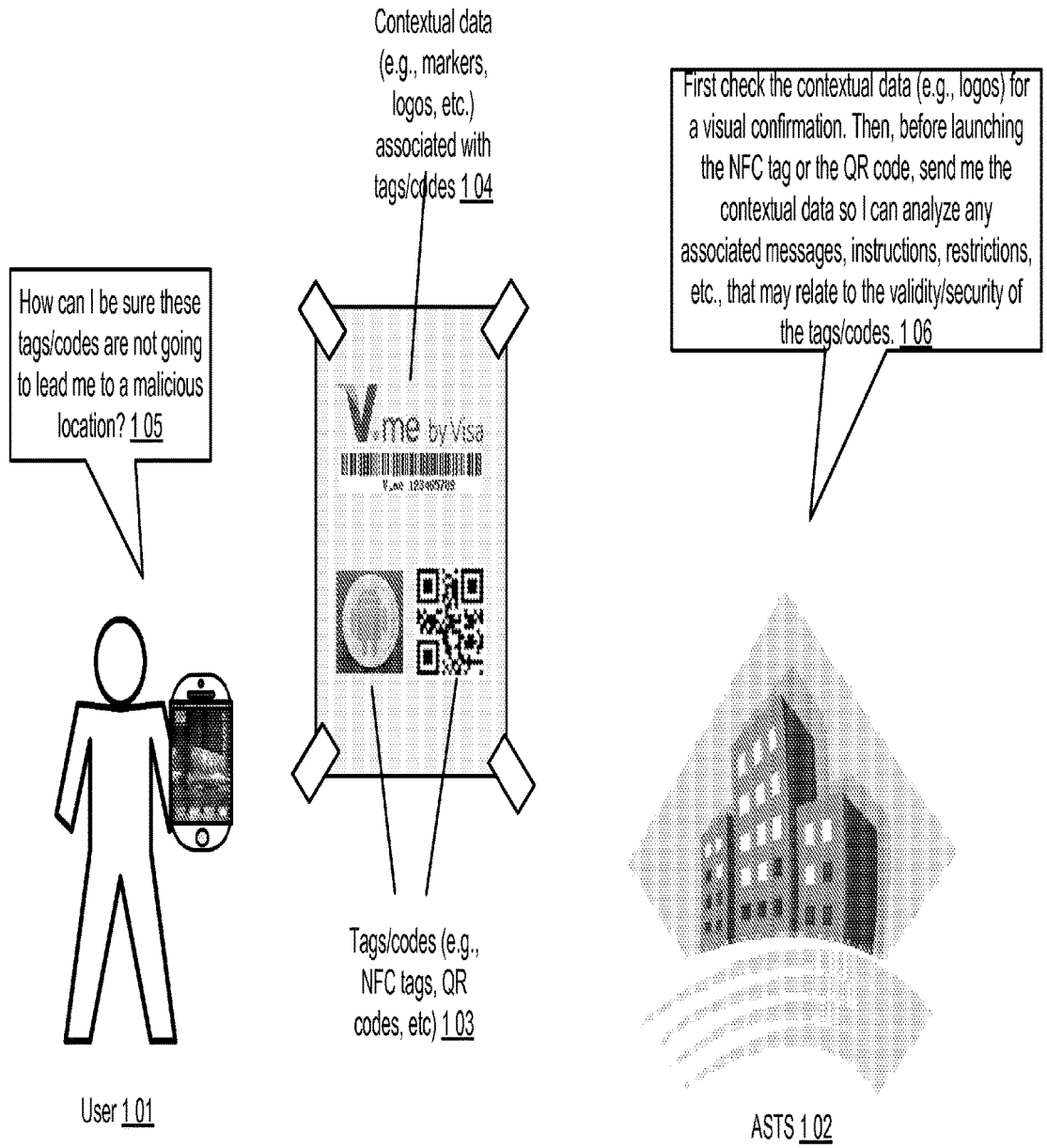
Figure 2A:
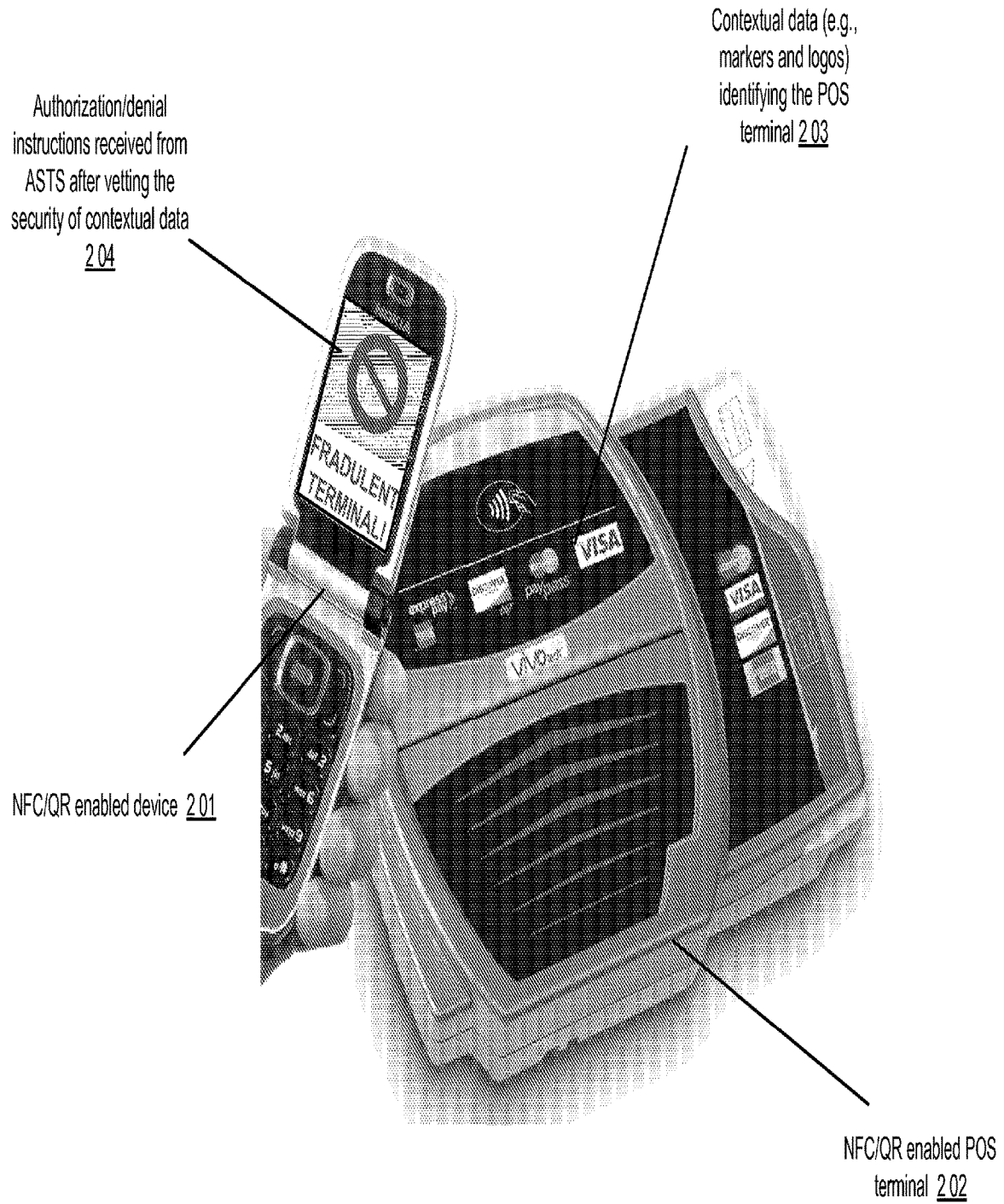

FIGS. 1, 2A-2B show block diagrams illustrating examples of the ASTS providing pre-launch security before launching instructions stored in NFC tags, QR codes and the like. With reference to FIG. 1, in some implementations, a user 101 may wish to use a device such as a smartphone or a smart accessory (e.g., a wearable device, such as a watch) to access the data stored in NFC tags, RFID tags, QR codes, and/or the like 103. For example, the tags/codes 103 may direct the user 101 to advertising materials, may be used to provide quick access to checkout at merchant POS terminals, and/or may be used in myriad situations such as, but not limited to, automating and/or enabling certain tasks to be performed by the user's 101 device (e.g., configuring its Wi-Fi connection), etc. Unfortunately, the content received or actions triggered by the tags/codes 103 may not always be what the user 101 expects. For example, there may be situations where these tags/codes are compromised, thus subjecting the user's device to malicious or undesired actions or content. Due to such security or other concerns, the user 101, prior to accessing the data stored within the tags/codes 103, may wish to make sure that they are not compromised (e.g., 105). In other words, the user 101 may wish to verify the validity, integrity, security, and/or contents of the tags/codes 103 before allowing his device to act in accordance to the tags/codes 103 (e.g., launching links, downloading apps, etc.).

The ASTS 102, which may be made accessible to the user 101 via a remote server and network (e.g., the Internet), provides verification/security services for assessing whether a tag/code 103 encountered by the user 101 is trust-worthy. In some embodiments, the tags/codes 103 may have associated contextual data, such as markers, logos, domain name, website address, serial number, appearance of the terminal, appearance of the tags/codes, location, date, time, etc. (e.g., 104), that may give clues as to the possible contents and trust-worthiness of the tags/codes 103. Unfortunately, the contextual data 104 as well as the tags/codes 103 may be victims of man-in-the-middle types of attacks (e.g., their integrity might have been compromised). One service (e.g., 106) that the ASTS 102 may provide (as discussed in more detail below), for example, is to verify the legitimacy of the tags/codes 103 by analyzing a user-transmitted image, video, sound sample, and/or any other media capture of the tags/codes 103 and the associated contextual data 104.

With reference to FIGS. 2A-2B, in some implementations, a user may wish to engage in transactions with an NFC/QR enabled point of sale (POS) terminal 202. For example, the user may wish to use its NFC/RFID-enabled credit card or mobile device 201 to wirelessly transmit payment information to the POS terminal 202. In some embodiments, the user may wish to verify that the POS terminal 202 is secure/legitimate and would not expose the user's information or device 201 to security compromises. For example, the POS terminal 202 may be fraudulent, and the proposed transaction may result in the user's device 201 as well as financial information being exposed to security risks.

The user may wish to verify the legitimacy of the POS terminal 202 before transacting with it. In some implementations, the user may use its mobile device 201 to capture a video, image, sound sample, and/or any other media capture of the POS terminal 202 or tags/codes, along with any associated contextual data 203, such as markers, logos, serial numbers, etc. Once captured, the media data may then be transmitted to the ASTS for security verification. In response 204, the ASTS may inform the user of the security status of the POS terminal 202 or may grant or deny access to the contents of the tags/codes (e.g., links, apps, etc.), based on their security status. In some embodiments, the ASTS may send the user's mobile device 201 a reference media (e.g., picture, video, etc.) of a POS terminal that is expected at the merchant's POS, so the user can compare it to the POS terminal 202 before him and visually validate its legitimacy. In some embodiments, the ASTS may send a URL link at which the user may find pictures, videos, descriptions, etc., of the expected terminal for comparison and identification purposes (e.g., 205).

Figure 3A:
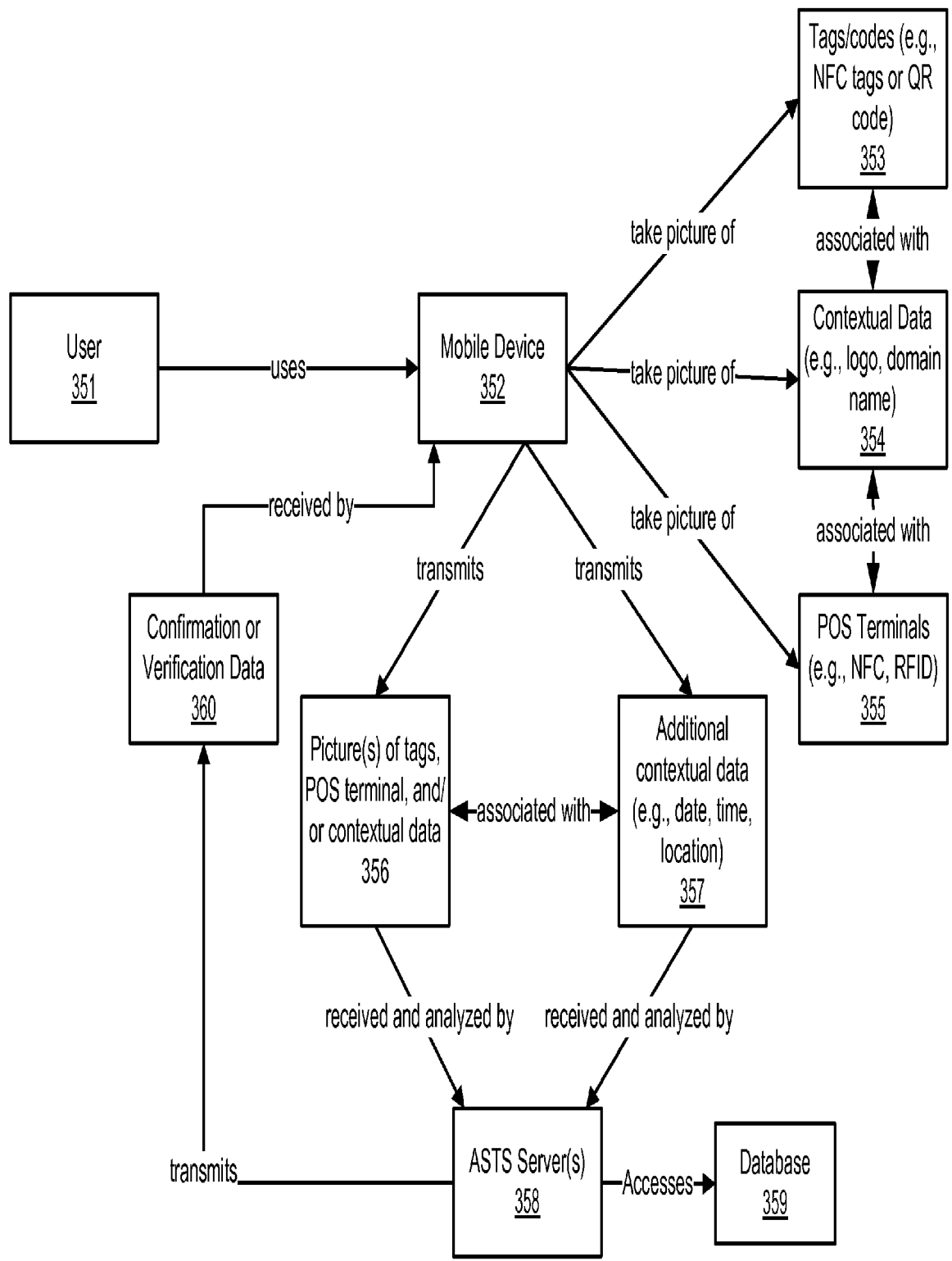
FIG. 3A shows exemplary aspects of the ASTS system.

FIG. 3A shows a block diagram illustrating aspects of the ASTS system. In some embodiments, a user 351 may wish to verify the trust-worthiness of a POS terminal 355 or tag/code (e.g., NFC tag, RFID tag, QR code, etc.) 353. The user 351 may use his mobile device 352 (e.g., smartphone, smart accessory, or any other networked image/video/sound capturing devices) to capture media information (e.g., take a picture or video of) of the POS terminal 355 or tag/code 353. The same or another captured media information may include any contextual data 354 (e.g., marks, logos, serial number, domain name, visual appearance, surrounding environment, etc.) associated with the POS terminal 355 or tag/code 353. The captured media information 356 of the POS terminal 355 or tag/code 353, as well as any associated contextual data 354, may then be transmitted by the mobile device 352 (or another networked device separate from the device used for capturing the media information) to a remote ASTS server(s) 358. In one exemplary implementation, the media information (e.g., image files, video files, etc.) may be directly transmitted to the ASTS server(s) 358. In another exemplary implementation, the media information may be uploaded onto a cloud server and a link to the uploaded media information may be transmitted to and used by the ASTS server(s) 358 to obtain the media information. In addition, the mobile device 352 (or the aforementioned other networked device) may transmit to the ASTS server(s) 358 additional contextual data 357 associated with the desired transaction between the user's mobile device 352 and the POS terminal 355 or tag/code 353. For example, such additional contextual data may include the approximate time, date, location, etc. at which the media information 356 was captured.

The ASTS server(s) 358 receives the information (e.g., 356 and 357) and analyzes it. As will be described in further detail below, in some embodiments the ASTS server(s) 358 may access a database 359 of information useful for determining, e.g., the trust-worthiness of POS terminals/tags/codes and/or the content expected of the particular tags/codes. For example, the ASTS server(s) 358 may query the database 359 for images or videos of POS terminals expected to be used by the merchant whose store the user 351 is currently in (this information, for example, may be derived from the location or GPS information included in the additional contextual data 357). In some embodiments, the ASTS server(s) 358 may query the database 359 for pictures, serial numbers, etc., of known compromised POS terminals. In yet other embodiments, to verify a tag/code, the ASTS server(s) 358 may query a database 359 for known/ expected tags/code associated with the observed contextual data 354 (e.g., if the contextual data is a Visa logo, the ASTS server 358 may query for tags/codes known to be provided by Visa). The ASTS server(s) 358 may compare the information queried from the database 359 with the received information (e.g., 356 and/or 357) and make an assessment of whether the POS terminal 355 or tag/code 353 is trustworthy. In some embodiments, the database 359 may return instructions/restrictions associated with a particular observed logo (or other types of contextual data) and verify whether the POS terminal/tag/code in question satisfy the instructions/restrictions (e.g., a restriction may be an expiration date for a QR code, in which case the ASTS server may verify whether the QR code in question has expired based on the current date). In some embodiments, a message reflecting the assessment 360 is then sent to and received by the user's mobile device 352. In some embodiments, the ASTS server(s) 358 may send the information returned from the database 359 (e.g., information regarding known, legitimate POS terminals and/or information regarding fraudulent POS terminals) to the user's mobile device 352 for the user 351 to make the assessment himself. The message 360 may also include a recommendation, authorization, or command for whether the user device should commence transacting/ interacting with the POS terminal/tag/code.

Figure 3B:
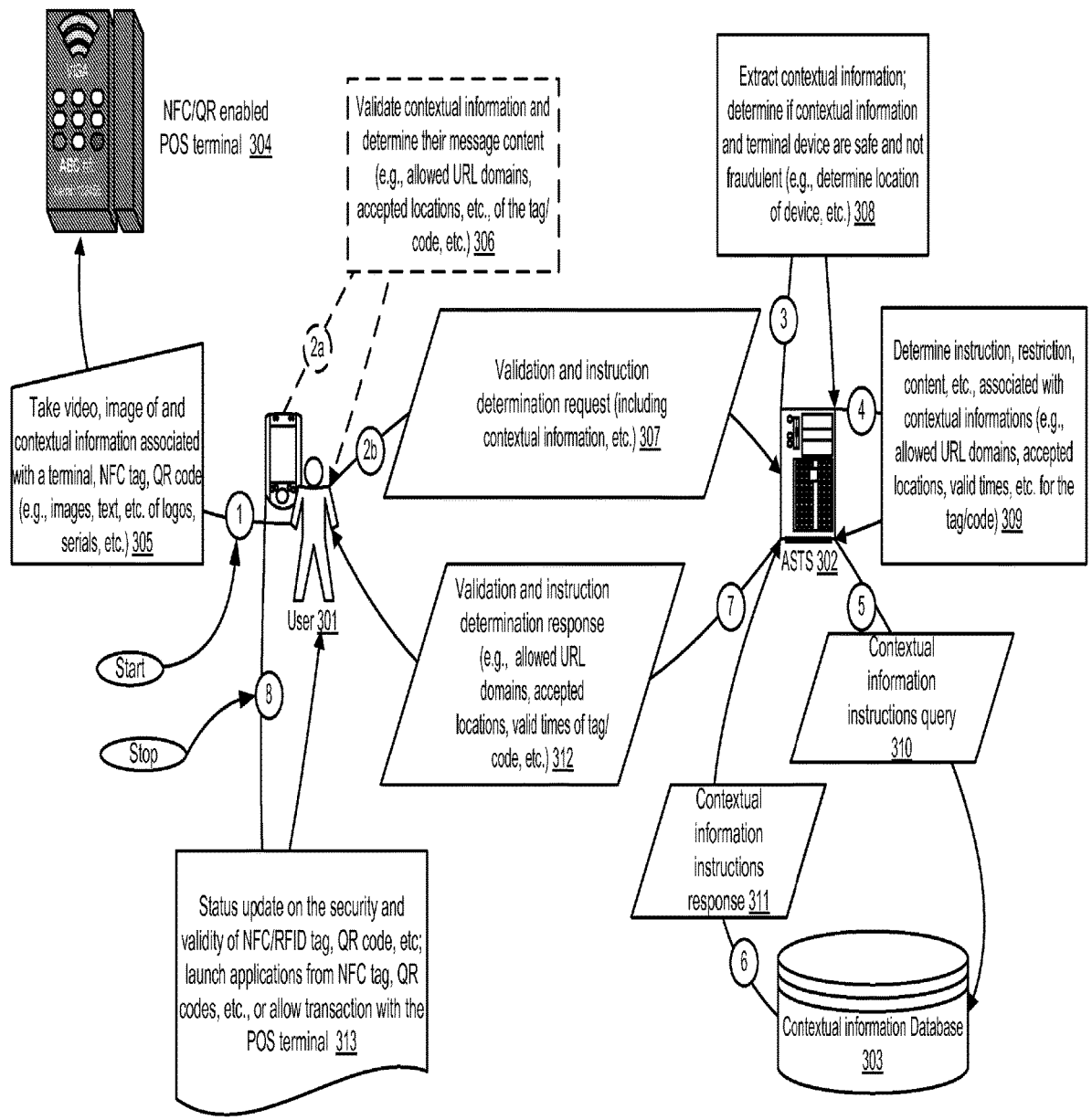
FIG. 3B shows a datagraph diagram illustrating examples of validating the security of POS terminals and/or tags and codes based on video and other media inputs of the POS terminals/tags/codes and associated contextual data.

FIG. 3B shows a datagraph diagram illustrating examples of transforming video and other media information of POS terminals or tags/codes, as well as any associated contextual data, via an ASTS component, into (1) ways to validate the POS terminals/tags/codes' security, and/or (2) instructions/ restrictions regulating access to or action on the data stored in the tags and codes. In some implementations, a user 301 may wish to engage in a transaction with an NFC/RFID enabled POS terminal and/or a tag/code (e.g., 304). In some implementations, the user 301 may wish to verify the POS terminal 304 is secure and safe or that the NFC tags/QR codes, etc., are not malicious and would not lead to the user's 301 device and/or financial information being compromised. For example, the user 301 may wish to have the terminal, tags, codes, etc., verified before proceeding with the transaction. To do so, in some embodiments the user 301 may capture media information (e.g., videos, images, sound samples, or texts, which may be extracted from a picture snapshot) of the terminal/tag/code 304 and any associated contextual information (e.g. logos, serial numbers, etc.) (e.g., 305). In some embodiments, the user 301 may take a snapshot of a QR code (e.g., video or image of a QR code itself). In another embodiment, the user 301 may scan the QR code using a mobile device that, for example, has an app executing on it capable of scanning and decoding the QR code, and obtain its contents, such as text, links, and/or the like. In some embodiments, the user 301 may obtain videos, images, etc., of identifying characteristics of the POS terminal device 304. For example, the user 301 may utilize a device such as a smartphone to obtain pictures, videos, etc., of logos, serial numbers, symbols, appearance, and/or the like of the POS terminal 304. In yet another example, the user 301 may also obtain sound samples of the POS terminal 304.

Once all the data (including contextual information) from the terminals/tags/codes 304 are obtained, the user 301 in some embodiments may utilize his device to verify, based on the obtained data, the security or access restrictions of the terminals/tags/codes 304. For example, the user's device may determine if the contextual information contains or is associated with further instructions dictating conditions under which the NFC/QR applications, such as links, should be launched (e.g., 306). For example, a contextual information such as an icon of a map attached to an NFC tag and/or QR code may indicate that the user 301 should trust the NFC and/or the QR code only in a specified geographical location. In such a case, the user's device may use its GPS location capabilities to determine whether the geographical location requirement is satisfied and report the determination to the user. As another example, a logo of a company, such as Visa or V.me, may indicate that the only links (e.g., link information encoded within QR codes, etc.) to be trusted are ones whose Uniform Resource Locators (URLs) have the domain root visa.com. Again, the user's device may automatically make this determination and report its determination to the user 301.

In some implementations, the user 301 may choose to have all the data collected from the terminal/tag/code and associated contextual data, etc. (e.g., 305), to be sent to a security ASTS server 302 to verify their security and validity, and determine any instructions that might be associated with the contextual data that could dictate the conditions under which the NFC/QR applications should be launched. In some embodiments, the user device may also transmit the location of the terminal and the instantaneous time/date along with the collected data. For example, the user may retrieve the location information using the user device's GPS features, and/or any other location determining capabilities (including the terminal itself) such as Wi-Fi positioning, tower triangulation, etc. In some implementations, the user device may obtain some or all of this data and forward some or all of the data to the ASTS 302 with a request for validating the terminal/tag/code and determining the existence of any access instruction/requirements (e.g., 307). For example, the request to the ASTS server 302 may be a HTTP(S) POST message including XML-formatted data. An example listing of a validation and instruction determination request 307, substantially in the form of a HTTP(S) POST message including XML-formatted data, is provided below:

```
POST /verificationrequest.php HTTP/1.1
Host: www.ASTSecurity.com
Content-Type: Application/XML
Content-Length: 667
<?XML version = "1.0" encoding = "UTF-8"?>
<verify_request>
   <timestamp>2031-04-01 23:59:59</timestamp>
   <digital_sign>45e2085fa20496c91df574dc5652e145 </digital_sign>
   <QR_params >
      <qr_data>qr_snapshot.pdf</qr_data>
      <qr_size>257000_bytes</qr_size>
      <qr_version>4(33x33)</qr_version>
      <qr_resolution>180_240_dpi</qr_resolution>
   </QR_params >
   // decoded by user device
   //<QR_params >
   //    <location_link>www.musicstore.com</location_link>
   //    <QR_id>fsd532hg3hf66</QR_id>
   //    <merchant_id>AE783</merchant_id>
   //    <merchant_name>Music Store, Inc. </merchant_ name>
   //    <store_id>88234</store_id>
   //    <post_location>6th Ave and 42nd St</post_location>
   //    <transaction_id>AFE 1213344</transaction_id>
   //</QR_params >
   <Marker_1>
      <marker_type>image</marker_type>
      <image_data>logo.jpg</image_data>
      <image_size>124000_bytes</image_size>
      <image_orientation>23_degrees</image_orientation>
      <image_dimension>1000_800_pixels</image_dimension>
      <image_resolution>340_240_dpi</image_resolution>
   </Marker_1>
   <Marker_2>
   // if OCR'ed by user device itself
      <marker_type>text</marker_type>
      <text_data>serial no.:3214148723</text_data>
      <text_font>Monaco</text_font>
      <text_fontsize>12</text_fontsize>
   </Marker_2>
   <Marker_3>
      <marker_type>audio</marker_type>
      <audio_data>jingle.mp3</audio_data>
      <audio_duration>00:02:11</audio_duration>
      <audio_size>2100000_bytes</audio_size>
      <audio_frqncy>44000Hz</audio_frqncy>
   </Marker_3>
   <Marker_4>
      <marker_type>video</marker_type>
      <video_data>POSterminal.avi</video_data>
      <video_duration>00:00:17</video_duration>
      <video_size>13000000_bytes</video_size>
   </Marker_4>
</verify_request>
```

Upon receiving the request 307, in some implementations, the ASTS 302 server may extract the contextual data from the received request 307 and determine the legitimacy of the POS terminal 304 or tags/codes. For example, the ASTS 302 server may analyze whatever format the contextual data is in, be it texts, images, videos, audios, and the like and determine whether the contextual data is fraudulent and whether the associated NFC/RFID tags, the QR codes, the POS terminals, etc., are compromised (e.g., 308). In some embodiments, the ASTS server 302 may read off identifying characteristics of POS terminals 304 from the contextual data and use the extracted characteristics to validate the POS terminal 304. For example, the ASTS server 302 may identify a company logo on the POS terminal 304 and query a database for expected images or characteristics (e.g., color, model, size, shape, profile, etc.) of known POS terminals produced by the associated company. The expected characteristics are then compared to the actual observed characteristics of the POS terminal 304 in question (as captured by the user's 301 mobile device) to determine whether the POS terminal 304 is trust-worthy. In some embodiments, location information (e.g., GPS location information received from the user's 301 mobile device) may also be used to determine the expected type of POS terminal 304. For example, the ASTS 302 server may determine that the received location information corresponds to a particular merchant. Based on the merchant information, the ASTS 302 server may query a data source to determine the types of POS terminals that the merchant is known to use. The characteristics of the expected POS terminals may then be compared to the characteristics of POS terminal 304 in question to determine its legitimacy.

In some embodiments, the ASTS 302 server may have received a request from the user 301 to ascertain the security of a QR code. The ASTS 302 server may utilize some implementations of QR code security verification components as described in U.S. Application Ser. No. 61/800,012, titled "SNAP Mobile Security Apparatuses, Methods and Systems," the entire contents of which are expressly incorporated by reference herein. In some embodiments, the ASTS 302 server may determine if there are any instructions, restrictions and the like associated with the QR code (e.g., 309). For example, a logo or domain name extracted from the contextual data may indicate that the QR code (or NFC tag, etc.) should only include URL addresses (e.g., visa.com) associated with the logo (V.me or Visa). In another example, a map icon, once verified by ASTS as valid, may have restrictions associated with it indicating that the tags/codes should be accessed only in certain geographical locations. In yet another example, a contextual data may indicate restrictions specifying times/dates during which the POS terminal, tag, or code is valid. For example, the POS terminal, tag, or code may have an associated expiration date (e.g., the contextual data may be a printed date, or alternatively the contextual data may be a marker/logo which can be use to query a database for associated expiration dates). As another example, if it has been discovered that a POS terminal/tag/code has been compromised or is no longer trust-worthy, database records associated with the POS terminal/tag/code's contextual data (e.g., logos) may be updated to indicate that the POS terminal/tag/code should no longer be used. In some embodiments, the ASTS 302 server may retrieve such instructions, restrictions and the like associated with the contextual data by querying a contextual information database 303. For example, the ASTS 302 server may issue PHP/SQL commands to query a database table (such as FIG. 5, Marker 519*m*) in the contextual information database 303 for instructions/restrictions associated with a particular contextual datum (e.g., logo), as depicted in FIG. 3 at label 310. An exemplary instructions query 310, substantially in the form of PHP/SQL commands, is provided below:

```
<?PHP
header('Content-Type: text/plain');
mysql_connect("254.93.179.112",$DBserver,$password); // access database
    server
mysql_select_db("ASTS DB.SQL"); // select database table to search
//create query
$query = "SELECT marker_instructions marker_restrictions FROM
Marker
    WHERE marker_id LIKE $marker";
$result = mysql_query($query); // perform the search query
mysql_close("ASTS_DB.SQL"); // close database access
?>
```

The ASTS 302 server, upon receiving the response (e.g., 311) to its query, may generate and transmit an appropriate instruction the user's 301 device (e.g., 312).

In some embodiments, once the ASTS 302 server has analyzed the contextual data and determined the trustworthiness of the POS terminal/code/tag in question, the ASTS 302 server may respond back to the user's 301 device with a determination of the security status of the POS terminal/code/tag (e.g., 312). For example, the ASTS 302 server may respond to the user's 301 device with a recommendation of whether to allow transaction with the POS terminal or access to the payload of the tag/code. For example, the ASTS 302 server may discover that the QR codes have been tampered with (e.g., man-in-the-middle attack, etc.), and may inform the user of this finding and deny authorization to, e.g., launch a link retrieved from the decoded QR code. In some implementations, the ASTS 302 server may inform the user 301 the make, model, serial number, color, shape, size, appearance, and/or any identifying characteristics of an expected POS terminal. For example, the ASTS 302 server may send back to the user a picture, video, etc., of a POS terminal that is expected at the merchant, so the user can compare and validate that the actual POS terminal 304 present is not fraudulent. In some embodiments, the ASTS 302 server may also send a URL link where the user may find pictures, videos, descriptions, etc., of the expected terminal for comparison and identification purposes. In some implementations, the ASTS 302 server may verify that the tags/codes are valid and may send a response back to the user device specifying instructions, restrictions and the like that are conditions of interacting with the tags/codes (e.g., allowable Web domain addresses, accepted physical locations of the tags/codes, valid dates and times, etc.). The ASTS 302 server in some embodiments may provide a response to the user device as a HTTP(S) POST message including XML-formatted data. An example listing of a validation and instruction determination response 312, substantially in the form of a HTTP(S) POST message including XML-formatted data, is provided below:

```
POST /verificationresponse.php HTTP/1.1
Host: www.ASTSecurity.com
Content-Type: Application/XML
Content-Length: 667
<?XML version = "1.0" encoding = "UTF-8"?>
<verify_response>
    <timestamp>2031-04-01 23:59:59</timestamp>
    <digital_sign>45e2085fa20496c91df574dc5652e145 </digital_sign>
    <marker_device_data>
        <device_identification>
            <POS_termianl_model>VivoMach</POS_terminal_model>
        <POS_termianl_model_yr>2007ver2</POS_terminal_model_yr>
            <POS_termianl_color>(0,0,0)=(black)</POS_terminal_color>
            <POS_terminal_serial>sd78njiy23809hk</POS_terminal_serial>
            <digital_certificate>
                DigiCert:: cert(Sdata,'certify.cert')
            </digital_certificate>
        </device_identification>
        <device_atmospheric_restrictions>
            <POS_terminal_loc>NY Gym(6$^{th}$ Ave and 42$^{nd}$
St)</POS_terminal_loc>
            <POS_terminal_exp>  exp_date=Jan012017
        </POS_terminal_exp>
```

```
    <location_boundry> Midtown </location_boundry>
    <QR_link_restriction> root="visa.com" </QR_link_restriction>
  <POS_termnal_merchant_type>apparel</POS_termnal_merchant_type><
  </device_atmospheric_restrictions>
  <identifiers_feedback>
    <POS_terminal_stock_pic>
      VivoModelA7.jpg
    </POS_terminal_stock_pic>
    <POS_terminal_stock_vid>
      VivoModelA7.avi
    </POS_terminal_stock_vid>
    <POS_terminal_id_link>
www.amazon.com/electronics/POSterminal/stockpics/pic1.htm></POS_terminal_id_link>
  </identifiers_feedback>
  </marker_device_data>
</verify_response>
```

Upon receiving the response from the ASTS 302 server, the user 301 may decide to continue with the transaction if the response affirms the security of the NFC/RFID tags, the QR codes, or the POS terminal, or decline to do so if the ASTS 302 server response indicates otherwise (e.g., 313).

FIGS. 4A-B show logic flow diagrams illustrating examples of transforming video and other media inputs of POS terminals/tags/codes and associated contextual data, via an ASTS component, into ways to validate the POS terminal/tag/code security, and into instructions/restrictions regulating interactions with the POS terminal/tags/codes. With reference to FIG. 4A, in some implementations, a user device, before commencing a transaction with a POS terminal or an action based on a tag/code, may send to the ASTS server media files, such as videos, images, sound samples, etc., of the POS terminal/tag/code in question as well as any contextual data (e.g., 401). For example, the contextual data include any identifying characteristics associated with the POS terminal/tag/code, such as, but not limited to logos, serial numbers, symbols, and/or the like. In some embodiments, the user device may also transmit the location of the terminal/tag/code as well as the date and time.

Upon receiving the media file input, in some implementations, the ASTS server may determine their file formats (e.g., 402), and initiate the security verification analysis. As mentioned, the media file input may be received in several formats, such as, but not limited to, image, video, audio, text (e.g., the user device may have extracted text from an image, etc.) and the like. For example, QR codes may already have been decoded by the user device, and the payload may be received in text format. In another embodiment, a snapshot picture of an undecoded QR code may be received in an image format, such as, but not limited to jpg, png, gif, tif, etc. In yet another embodiment, a media file may be a video depicting the NFC tag, QR code, or the POS terminal in question, along with contextual data such as, but not limited, to logos, names, serial numbers, symbols, and/or the like. When the received media input file is a video (e.g., 403), the ASTS server may slice the video into a series of images in preparation for further analysis (e.g., 404). In some embodiments, the input file itself may be in an image format (e.g., 405). For example, the received input image file, and/or any of the still images from a video (e.g., from 404) may contain an image of a QR code (e.g., 410). In such embodiments, the ASTS server may verify the security of the QR code in a manner similar to the one described in U.S. Application Ser. No. 61/800,012, titled "SNAP Mobile Security Apparatuses, Methods and Systems," the entire contents of which are expressly incorporated by reference herein (e.g., 411). In some implementations, the QR code may fail the security verification (e.g., 414), and the server may generate a message to the user device informing the user of the failed security clearance and recommending/instructing the user device to not proceed with the transaction (e.g., 415). On the other hand, if the security of the QR code is verified, the ASTS server then determines whether the content of the QR code satisfies instructions/restrictions associated with the QR code's contextual data. As another example, the instructions/restrictions associated with the contextual data (e.g., a Visa logo) may dictate that any URL links encoded in the tag/code should have a particular root Web domain, such as visa.com; otherwise the transaction should not proceed and the tag/code should be deemed compromised (e.g., 425, in FIG. 4B).

In some implementations, the received input image file and/or any of the still images from a video (e.g., from 404) may contain contextual data such as logos, serial numbers, terminal model identifiers, icons, etc. In such implementations, the server may first enhance the images by, for example, sharpening and/or rotating the images (e.g., 412). Once the images are enhanced, the ASTS server may process the images to extract texts and/or to identify the content therein (e.g., POS terminal model, company name, the company associated with a logo, etc.) (e.g., 413). For example, the server may utilize a service such as, but not limited to Google Goggles™, to identify the extracted figure. As another example, the ASTS server may utilize a tagging service (e.g., a human tagging service such as, but not limited to, the app "tap tap see") to identify the extracted content. Upon identifying the extracted content, in some embodiments, the ASTS server may initiate the security verification of such content, an embodiment of which is described below with reference to FIG. 4B.

In some embodiments, the input file may be audio (e.g., 406), and the ASTS server may utilize one of several available sound-to-text converters to convert the audio to text (e.g., 408). If successful, the converted text may be analyzed as described hereinabove (e.g., 413). In some implementations, the ASTS server may employ sound analysis techniques to extract any content that can be used to verify the security of the POS terminal/tag/code where the transaction is pending. For example, the ASTS server may analyze the frequency spectrum of the audio input and use it as a basis for the security verification (e.g., 409). An embodiment of the security verification is described below with reference to FIG. 4B.

In some embodiments, if the media input file's format is not recognized (e.g., not video 403, image 405, nor audio 406), the ASTS server may generate a message to inform the user of such finding (e.g., 407).

With reference to FIG. 4B, in some implementations, the ASTS server initiates the validation and security verification of contextual data that have been received from the user device and/or extracted from the media files obtained from the user device, and identified as discussed with reference to FIG. 4A (e.g., 416). As discussed above, the contextual data may be logos, icons, symbols, etc. that have been extracted from the images, or names, domain names, serial numbers, and/or the like of identifying characteristics that are textual in nature (e.g., 413). The markers may alternatively be frequency spectra of an audio sample that have been obtained from spectrum analysis of a sound input signal (e.g., 409). In such implementations, the ASTS server analyzes all the contextual data to verify their validity and security and that they have not been compromised. In such embodiments, the ASTS server may generate a query (e.g., 417) to a contextual database to verify that the obtained contextual data are indeed valid, and/or determine if there are any associated instructions/restrictions, etc.

Upon receiving the query response (e.g., 419) from the database, the ASTS server may analyze the response data to determine if the contextual data and/or POS terminal/tag/code are valid (e.g., 420). By way of non-limiting examples, the ASTS server may provide verification as described in the following examples. For example, the ASTS server may determine whether a POS terminal belongs to the merchant whom the user assumes is a party in the pending transaction. In one implementation, the ASTS server may query the database for characteristics of known POS terminals used by the merchant (e.g., based on logos, merchant name, location, etc.) and compare the characteristics with the actual POS terminal observed by the user. As another example, the ASTS server may query the database for known merchants using the particular POS terminal in question (e.g., as identified by the serial number extracted from an image of the POS terminal) and determine whether the list of merchants includes the one whom the user is transacting with. If the ASTS server cannot validate the contextual data and/or POS terminal/tag/code, it may generate a message to inform the user as such and to recommend that the POS terminal/tag/code not be accessed or transacted with (e.g., 420).

In some implementations, the ASTS server may determine if the location of the POS terminal/tag/code, as gleaned from the location data received from the user device (e.g., GPS, Wi-Fi positioning, etc.), comports with an instruction associated with the contextual data (e.g., 422). For example, if the database response 419 indicates that a serial number is associated with restrictions indicating that an associated POS terminal is only to be used in an electronics store, but the location data as transmitted by the user's device indicates that the POS terminal in question is located in a restaurant, then the terminal would have failed the security verification. If so, the ASTS server would generate a message to the user device informing the user of the failed security clearance and denying authorization to proceed with the transaction (e.g., 424).

As another example, the restriction associated with a contextual data may state that past a given date, the POS terminal/tag/code should not be trusted or is no longer valid (e.g., the POS terminal is reported stolen, or a promotion associated with a QR code has expired) (e.g., 423). If the current date/time is past the given date, then the ASTS server would determine that the POS terminal/tag/code has failed verification, and accordingly generate a message informing the user as such and denying authorization to proceed with the transaction (e.g., 424).

In some embodiments, the ASTS server may verify that any other instructions/restrictions are not violated (e.g., 426.) For example, a restriction may exclude certain brands of POS terminals known to be frequently compromised. In such embodiments, the ASTS server may determine that the POS terminal is of such a brand (e.g., based on the serial number or appearance characteristics extracted from the contextual data), and accordingly generate a message to the user device informing the user of the failed security clearance and denying authorization to proceed with the transaction (e.g., 427).

During the verification process, if no violation is discovered, in some embodiments the server may generate a message to the user device informing the user that no security risk was found, and granting authorization to proceed with the transaction (e.g., 428). If the transaction is with an NFC tag, the user may choose to verify the security of the NFC tag in a manner similar to the implementations described in U.S. Application Ser. No. 61/776,746, titled "Certificate Authenticated, Tag-Initiated Dormant Transaction Apparatuses, Methods and Systems," the entire contents of which are expressly incorporated by reference herein (e.g., 429).

ASTS Controller

Figure 5:
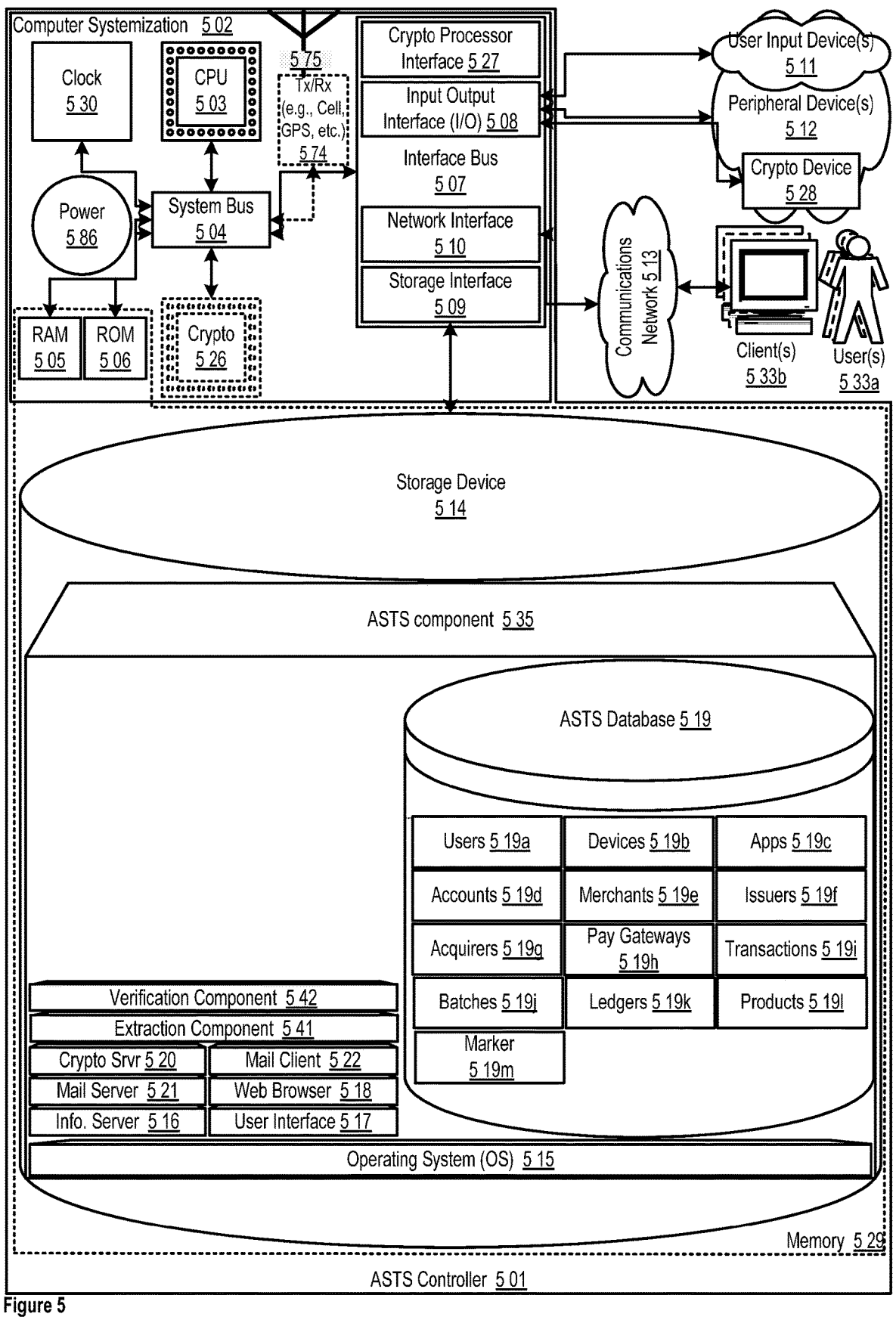
FIG. 5 shows a block diagram illustrating examples of an ASTS controller.

FIG. 5 shows a block diagram illustrating examples of an ASTS controller 501. In this embodiment, the ASTS controller 501 may serve to aggregate, process, store, search, serve, identify, instruct, generate, match, and/or facilitate interactions with a computer through various technologies, and/or other related data.

Users, e.g., 533a, which may be people and/or other systems, may engage information technology systems (e.g., computers) to facilitate information processing. In turn, computers employ processors to process information; such processors 503 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ASTS controller 501 may be connected to and/or communicate with entities such as, but not limited to: one or more users from user input devices 511; peripheral devices 512; an optional cryptographic processor device 528; and/or a communications network 513. For example, the ASTS controller 501 may be connected to and/or communicate with users, e.g., 533a, operating client device(s), e.g., 533b, including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™, HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ASTS controller 501 may be based on computer systems that may comprise, but are not limited to, components such as: a computer systemization 502 connected to memory 529.

Computer Systemization

A computer systemization 502 may comprise a clock 530, central processing unit ("CPU(s)" and/or "processor(s)" (these terms are used interchangeably throughout the disclosure unless noted to the contrary)) 503, a memory 529 (e.g., a read only memory (ROM) 506, a random access memory (RAM) 505, etc.), and/or an interface bus 507, and most frequently, although not necessarily, are all interconnected and/or communicating through a system bus 504 on one or more (mother)board(s) 502 having conductive and/or otherwise transportive circuit pathways through which instructions (e.g., binary encoded signals) may travel to effectuate communications, operations, storage, etc. The computer systemization may be connected to a power source 586; e.g., optionally the power source may be internal. Optionally, a cryptographic processor 526 and/or transceivers (e.g., ICs) 574 may be connected to the system bus. In another embodiment, the cryptographic processor and/or transceivers may be connected as either internal and/or external peripheral devices 512 via the interface bus I/O. In turn, the transceivers may be connected to antenna(s) 575, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing ASTS controller to determine its location)); Broadcom BCM4329FKUBG transceiver chip (e.g., providing 802.11n, Bluetooth 2.1+EDR, FM, etc.), BCM28150 (HSPA+) and BCM2076 (Bluetooth 4.0, GPS, etc.); a Broadcom BCM4750IUB8 receiver chip (e.g., GPS); an Infineon Technologies X-Gold 618-PMB9800 (e.g., providing 2G/3G HSDPA/HSUPA communications); Intel's XMM 7160 (LTE & DC-HSPA), Qualcom's CDMA(2000), Mobile Data/Station Modem, Snapdragon; and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: floating point units, integer processing units, integrated system (bus) controllers, logic operating units, memory management control units, etc. and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state/value. The CPU may be a microprocessor such as: AMD's Athlon, Duron and/or Opteron; ARM's classic (e.g., ARM7/9/11), embedded (Coretx-M/R), application (Cortex-A), and secure processors; IBM and/or Motorola's DragonBall and PowerPC; IBM's and Sony's Cell processor; Intel's Atom, Celeron (Mobile), Core (2/Duo/i3/i5/i7), Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code). Such instruction passing facilitates communication within the ASTS controller and beyond through various interfaces. Should processing requirements dictate a greater amount speed and/or capacity, distributed processors (e.g., Distributed ASTS), mainframe, multi-core, parallel, and/or super-computer architectures may similarly be employed. Alternatively, should deployment requirements dictate greater portability, smaller mobile devices (e.g., smartphones, Personal Digital Assistants (PDAs), etc.) may be employed.

Depending on the particular implementation, features of the ASTS may be achieved by implementing a microcontroller such as CAST's R8051XC2 microcontroller; Intel's MCS 51 (i.e., 8051 microcontroller); and/or the like. Also, to implement certain features of the ASTS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ASTS component collection (distributed or otherwise) and/or features may be implemented via the microprocessor and/or via embedded components; e.g., via ASIC, coprocessor, DSP, FPGA, and/or the like. Alternately, some implementations of the ASTS may be implemented with embedded components that are configured and used to achieve a variety of features or signal processing.

Depending on the particular implementation, the embedded components may include software solutions, hardware solutions, and/or some combination of both hardware/software solutions. For example, ASTS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ASTS features. A hierarchy of programmable interconnects allow logic blocks to be interconnected as needed by the ASTS system designer/administrator, somewhat like a one-chip programmable breadboard. An FPGA's logic blocks can be programmed to perform the operation of basic logic gates such as AND, and XOR, or more complex combinational operators such as decoders or simple mathematical operations. In most FPGAs, the logic blocks also include memory elements, which may be circuit flip-flops or more complete blocks of memory. In some circumstances, the ASTS may be developed on regular FPGAs and then migrated into a fixed version that more resembles ASIC implementations. Alternate or coordinating implementations may migrate ASTS controller features to a final ASIC instead of or in addition to FPGAs. Depending on the implementation all of the aforementioned embedded components and microprocessors may be considered the "CPU" and/or "processor" for the ASTS.

(a) Power Source

The power source 586 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well.

In the case of solar cells, in one embodiment, the case provides an aperture through which the solar cell may capture photonic energy. The power cell 586 is connected to at least one of the interconnected subsequent components of the ASTS thereby providing an electric current to all their interconnected components. In one example, the power source 586 is connected to the system bus component 504. In an alternative embodiment, an outside power source 586 is provided through a connection across the I/O 508 interface. For example, a USB and/or IEEE 1394 connection carries both data and power across the connection and is therefore a suitable source of power.

Interface Adapters

Interface bus(ses) 507 may accept, connect, and/or communicate to a number of interface adapters, frequently, although not necessarily in the form of adapter cards, such as but not limited to: input output interfaces (I/O) 508, storage interfaces 509, network interfaces 510, and/or the like. Optionally, cryptographic processor interfaces 527 similarly may be connected to the interface bus. The interface bus provides for the communications of interface adapters with one another as well as with other components of the computer systemization. Interface adapters are adapted for a compatible interface bus. Interface adapters may connect to the interface bus via an expansion and/or slot architecture. Various expansion and/or slot architectures that be employed, such as, but not limited to: Accelerated Graphics Port (AGP), Card Bus, ExpressCard, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), Thunderbolt, and/or the like.

Storage interfaces 509 may accept, communicate, and/or connect to a number of storage devices such as, but not limited to: storage devices 514, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, Ethernet, fiber channel, Small Computer Systems Interface (SCSI), Thunderbolt, Universal Serial Bus (USB), and/or the like.

Network interfaces 510 may accept, communicate, and/or connect to a communications network 513. Through a communications network 513, the ASTS controller is accessible through remote clients 533b (e.g., computers with web browsers) by users 533a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ASTS), architectures may similarly be employed to pool, load balance, and/or otherwise increase the communicative bandwidth required by the ASTS controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 510 may be used to engage with various communications network types 513. For example, multiple network interfaces may be employed to allow for the communication over broadcast, multicast, and/or unicast networks.

Input Output interfaces (I/O) 508 may accept, communicate, and/or connect to user input devices 511, peripheral devices 512, cryptographic processor devices 528, and/or the like. I/O may employ connection protocols such as, but not limited to: audio: analog, digital, monaural, RCA, stereo, and/or the like; data: Apple Desktop Bus (ADB), Bluetooth, IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Display Port, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may be a video display, which may take the form of a Cathode Ray Tube (CRT), Liquid Crystal Display (LCD), Light Emitting Diode (LED), Organic Light Emitting Diode (OLED), Plasma, and/or the like based monitor with an interface (e.g., VGA, DVI circuitry and cable) that accepts signals from a video interface. The video interface composites information generated by a computer systemization and generates video signals based on the composited information in a video memory frame. Another output device is a television set, which accepts signals from a video interface. Often, the video interface provides the composited video information through a video connection interface that accepts a video display interface (e.g., an RCA composite video connector accepting an RCA composite video cable; a DVI connector accepting a DVI display cable, HDMI, etc.).

User input devices 511 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 512 may be connected and/or communicate to I/O and/or other facilities of the like such as network interfaces, storage interfaces, directly to the interface bus, system bus, the CPU, and/or the like. Peripheral devices may be external, internal and/or part of the ASTS controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), near field communication (NFC) devices, network interfaces, printers, radio frequency identifiers (RFIDs), scanners, storage devices, transceivers (e.g., cellular, GPS, etc.), video devices (e.g., goggles, monitors, etc.), video sources, visors, and/or the like. Peripheral devices often include types of input devices (e.g., microphones, cameras, etc.).

It should be noted that although user input devices and peripheral devices may be employed, the ASTS controller may be embodied as an embedded, dedicated, and/or monitor-less (i.e., headless) device, wherein access would be provided over a network interface connection.

Cryptographic units such as, but not limited to, microcontrollers, processors 526, interfaces 527, and/or devices 528 may be attached, and/or communicate with the ASTS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield (e.g., Solo, Connect, etc.), SafeNet's Luna PCI (e.g., 7100) series; Semaphore Communications' 40 MHz Roadrunner 184; sMIP's (e.g., 208956); Sun's Cryptographic Accelerators (e.g., Accelerator 6000 PCIe Board, Accelerator 500 Daughtercard);/(e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 529. However, memory is a fungible technology and resource, thus, any number of memory embodiments may be employed in lieu of or in concert with one another. It is to be understood that the ASTS controller and/or a computer systemization may employ various forms of memory 529. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In one configuration, memory 529 will include ROM 506, RAM 505, and a storage device 514. A storage device 514 may employ any number of computer storage devices/systems. Storage devices may include a drum; a (fixed and/or removable) magnetic disk drive; a magneto-optical drive; an optical drive (i.e., Blue-Ray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 529 may contain a collection of program and/or database components and/or data such as, but not limited to: operating system component(s) 515 (operating system); information server component(s) 516 (information server); user interface component(s) 517 (user interface); Web browser component(s) 518 (Web browser); database(s) 519; mail server component(s) 521; mail client component (s) 522; cryptographic server component(s) 520 (cryptographic server); the ASTS component(s) 535; and/or the like (i.e., collectively a component collection). These components may be stored and accessed from the storage devices and/or from storage devices accessible through an interface bus. Although non-conventional program components such as those in the component collection, may be stored in a local storage device 514, they may also be loaded and/or stored in memory such as: peripheral devices, RAM, remote storage facilities through a communications network, ROM, various forms of memory, and/or the like.

Operating System

The operating system component 515 is an executable program component facilitating the operation of the ASTS controller. The operating system may facilitate access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NTNista/XP (Server), Palm OS, and/or the like. In addition, emobile operating systems such as Apple's iOS, Google's Android, Hewlett Packard's WebOS, Microsoft Windows Mobile, and/or the like may be employed. Any of these operating systems may be embedded within the hardware of the ASTS controller, and/or stored/loaded into memory/storage. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ASTS controller to communicate with other entities through a communications network 513. Various communication protocols may be used by the ASTS controller as a subcarrier transport mechanism for interaction, such as, but not limited to: multicast, TCP/IP, UDP, unicast, and/or the like.

Information Server

An information server component 516 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Apple's iMessage, Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ASTS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ASTS database 519, operating systems, other program components, user interfaces, Web browsers, and/or the like.

Access to the ASTS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ASTS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ASTS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua and iOS's Cocoa Touch, IBM's OS/2, Google's Android Mobile UI, Microsoft's Windows 2000/2003/3.1/95/98/CE/Millenium/Mobile/NT/XPNista/7/8 (i.e., Aero, Metro), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery (UI), MooTools, Prototype, script.aculo.us, SWFObject, Yahoo! User Interface, any of which may be used and) provide a baseline and means of accessing and displaying information graphically to users.

A user interface component 517 is a stored program component that is executed by a CPU. The user interface may be a graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 518 is a stored program component that is executed by a CPU. The Web browser may be a hypertext viewing application such as Google's (Mobile) Chrome, Microsoft Internet Explorer, Netscape Navigator, Apple's (Mobile) Safari, embedded web browser objects such as through Apple's Cocoa (Touch) object class, and/or the like. Secure Web browsing may be supplied with 128bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., Chrome, FireFox, Internet Explorer, Safari Plug-in, and/or the like APIs), and/or the like. Web browsers and like information access tools may be integrated into PDAs, cellular telephones, smartphones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly effect the obtaining and the provision of information to users, user agents, and/or the like from the ASTS equipped nodes. The combined application may be nugatory on systems employing standard Web browsers.

Mail Server

A mail server component 521 is a stored program component that is executed by a CPU 503. The mail server may be an Internet mail server such as, but not limited to Apple's Mail Server (3), dovecot, sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ASTS.

Access to the ASTS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 522 is a stored program component that is executed by a CPU 503. The mail client may be a mail viewing application such as Apple (Mobile) Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 520 is a stored program component that is executed by a CPU 503, cryptographic processor 526, cryptographic processor interface 527, cryptographic processor device 528, and/or the like. Cryptographic processor interfaces will allow for expedition of encryption and/or decryption requests by the cryptographic component; however, the cryptographic component, alternatively, may run on a CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ASTS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ASTS component to engage in secure transactions if so desired. The cryptographic component facilitates the secure accessing of resources on the ASTS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The ASTS Database

The ASTS database component 519 may be embodied in a database and its stored data. The database is a stored program component, which is executed by the CPU; the stored program component portion configuring the CPU to process the stored data. The database may be any of a number of fault tolerant, relational, scalable, secure database such as DB2, MySQL, Oracle, Sybase, and/or the like. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ASTS database may be implemented using various standard data-structures, such as an array, hash, (linked) list, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the ASTS database is implemented as a data-structure, the use of the ASTS database 519 may be integrated into another component such as the ASTS component 535. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 519 includes several tables 519a-m. A Users table 519a may include fields such as, but not limited to: user_id, ssn, dob, first_name, last_name, age, state, address_firstline, address_secondline, zipcode, devices_list, contact_info, contact_type, alt_contact_info, alt_contact_type, and/or the like. The Users table may support and/or track multiple entity accounts on a ASTS. A Devices table 519b may include fields such as, but not limited to: device_ID, device_name, device_IP, device_MAC, device_type, device_model, device_version, device_OS, device_apps_list, device_securekey, wallet_app_installed_flag, and/or the like. An Apps table 519c may include fields such as, but not limited to: app_ID, app_name, app_type, app_dependencies, and/or the like. An Accounts table 519d may include fields such as, but not limited to: account_number, account_security_code, account name, issuer acquirer_flag, issuer_name, acquirer_name, account_address, routing_number, access_API_call, linked_wallets_list, and/or the like. A Merchants table 519e may include fields such as, but not limited to: merchant_id, merchant_name, merchant_address, ip_address, mac_address, auth_key, port_num, security_settings_list, and/or the like. An Issuers table 519f may include fields such as, but not limited to: issuer_id, issuer_name, issuer_address, ip_address, mac_address, auth_key, port_num, security_settings_list, and/or the like. An Acquirers table 519g may include fields such as, but not limited to: account_firstname, account_lastname, account_type, account_num, account_balance_list, billingaddress_line1, billingaddress_line2, billing_zipcode, billing_state, shipping_preferences, shippingaddress_line1, shippingaddress_line2, shipping_zipcode, shipping_state, and/or the like. A Pay Gateways table 519h may include fields such as, but not limited to: gateway_ID, gateway_IP, gateway_MAC, gateway_secure_key, gateway_access_list, gateway_API_call_list, gateway_services_list, and/or the like. A Transactions table 519i may include fields such as, but not limited to: order_id, user_id, timestamp, transaction_cost, purchase_details_list, num_products, products_list, product_type, product_params_list, product_title, product_summary, quantity, user_id, client_id, client_ip, client_type, client_model, operating_system, os_version, app_installed_flag, user_id, account_firstname, account_lastname, account_type, account_num, account_priority_account_ratio, billingaddress_line1, billingaddress_line2, billing_zipcode, billing_state, shipping_preferences, shippingaddress_line1, shippingaddress_line2, shipping_zipcode, shipping_state, merchant_id, merchant_name, merchant_auth_key, and/or the like. A Batches table 519*j* may include fields such as, but not limited to: batch_id, transaction_id_list, timestamp_list, cleared_flag_list, clearance_trigger_settings, and/or the like. A Ledgers table 519*k* may include fields such as, but not limited to: request_id, timestamp, deposit_amount, batch_id, transaction_id, clear_flag, deposit_account, transaction_summary, payor_name, payor_account, and/or the like. A Products table 519*l* may include fields such as, but not limited to: product_ID, product_title, product_attributes_list, product_price, tax_info_list, related_products_list, offers_list, discounts_list, rewards_list, merchants_list, merchant_availability_list, and/or the like. A Markers table 519*m* may include fields such as, but not limited to: marker_id, marker_type, NFC_markers, QR_markers, logos_list, symbols_list, serial_number_list, marker_instructions, marker_restrictions, and/or the like.

In one embodiment, the ASTS database may interact with other database systems. For example, employing a distributed database system, queries and data access by search ASTS component may treat the combination of the ASTS database, an integrated data security layer database as a single database entity.

In one embodiment, user programs may contain various user interface primitives, which may serve to update the ASTS. Also, various accounts may require custom database tables depending upon the environments and the types of clients the ASTS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 519*a-m*. The ASTS may be configured to keep track of various settings, inputs, and parameters via database controllers.

The ASTS database may communicate to and/or with other components in a component collection, including itself, and/or facilities of the like. Most frequently, the ASTS database communicates with the ASTS component, other program components, and/or the like. The database may contain, retain, and provide information regarding other nodes and data.

The ASTSs

The ASTS component 535 is a stored program component that is executed by a CPU. In one embodiment, the ASTS component incorporates any and/or all combinations of the aspects of the ASTS discussed in the previous figures. As such, the ASTS affects accessing, obtaining and the provision of information, services, transactions, and/or the like across various communications networks.

The ASTS component may transform video and other media inputs of POS terminals, NFC/RFID tags, QR/bar codes, and/or any associated contextual data via ASTS components into ways to validate the POS security and instructions/restrictions regulating access to and action on the data stored in the tags and codes, and/or the like and use of the ASTS. In one embodiment, the ASTS component 535 takes inputs (e.g., validation and instruction determination request 307; instructions data query 309; and/or the like) etc., and transforms the inputs via various components (e.g., Extraction Component 541; Verification Component 542; and/or the like), into outputs (e.g., validation and instruction determination response 312; instructions response 311; and/or the like).

The ASTS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ASTS server employs a cryptographic server to encrypt and decrypt communications. The ASTS component may communicate to and/or with other components in a component collection, including itself, and/or facilities of the like. Most frequently, the ASTS component communicates with the ASTS database, operating systems, other program components, and/or the like. The ASTS may contain, communicate, generate, obtain, and/or provide program component, system, user, and/or data communications, requests, and/or responses.

Distributed ASTSs

The structure and/or operation of any of the ASTS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ASTS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ASTS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of message
do {
   $input= "";
   $input = socket_read($client, 1024);
   $data .= $input;
} while($input != "");
// parse data to extract variables
$obj = json_decode($data, true);
// store input data in a database
mysql_connect("201.408.185.132",$DBserver,$password); // access database
   server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

For example, a grammar may be arranged to recognize the tokens of an HTTP post command, e.g.:

w3-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax Also, the following resources may be used to provide example embodiments regarding SOAP parser implementation:

http://www.xay.com/perl/site/lib/SOAP/Parser.html http://publib.boulder.ibm.com/infocenter/tivihelp/v2r1/index.jsp?topic=/com.ibm.IB MDI.doc/referenceguide295.htm and other parser implementations:
http://publib.boulder.ibm.com/infocenter/tivihelp/v2r1/index.jsp?topic=/com.ibm.IB MDI.doc/referenceguide259.htm all of which are hereby expressly incorporated by reference herein.

In order to address various issues and advance the art, the entirety of this application for AUGMENTED SMART TAG SECURITY APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows, by way of illustration, various example embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any data flow sequence(s), program components (a component collection), other components, and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, processors, services, servers, and/or the like that may execute asynchronously, concurrently, in parallel, simultaneously, synchronously, and/or the like also are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations-in-part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ASTS individual and/or enterprise user, database configuration and/or relational model, data type, data transmission and/or network framework, syntax structure, and/or the like, various embodiments of the ASTS may be implemented that allow a great deal of flexibility and customization. For example, aspects of the ASTS may be adapted for product identification. While various embodiments and discussions of the ASTS have been directed to security verification of smart tags/codes, however, it is to be understood that the embodiments described herein may be readily configured and/or customized for a wide variety of other applications and/or implementations.

What is claimed is:

1. A processor-implemented method comprising:
receiving, from a mobile device, a file including a network destination associated with a reference, the file being captured by the mobile device;
determining a file format of the captured file;
based on the determination of the file format, extracting contextual data from the captured file;
querying a data source associated with the reference based on the extracted contextual data;
based on the query, receiving validation information regarding the contextual data based on matching the contextual data to known contextual data in a database of references;
generating a message based on the validation information, the message for use in determining whether to allow the mobile device to interact with an endpoint corresponding to the reference; and
transmitting the message to the mobile device.

2. The method of claim 1, wherein the message informs a user of the mobile device of a security risk associated with the reference.

3. The method of claim 1, wherein captured file is a text file including a link address coded into a QR code.

4. The method of claim 1, wherein the validation information regarding the contextual data is based on a determination that a current date is not past an expiration date in the contextual data.

5. The method of claim 1, wherein the contextual data is one or more of a logo, a website address, a serial number, a location, or an expiration date.

6. The method of claim 1, wherein the contextual data may include a date and time at which the file was captured.

7. The method of claim 1, wherein the validation information includes an expiration date for the contextual data.

8. The method of claim 1, wherein the network destination is a Universal Record Locator (URL) and the data source is a list having one of approved URLs and rejected URLs.

9. The method of claim 1, wherein the captured file is one or more of a video file, a sound file, an image file, or a text file.

10. The method of claim 1, wherein the validation information includes merchant information associated with the reference.

11. A non-transitory computer-readable medium encoded with instructions for causing a processing system to execute steps for securing transactions, the steps comprising:
receiving, from a mobile device, a file including a network destination associated with a reference, the file being captured by the mobile device;
determining a file format of the captured file;
based on the determination of the file format, extracting contextual data from the captured file;
querying a data source associated with the reference based on the extracted contextual data;

based on the query, receiving validation information regarding the contextual data based on matching the contextual data to known contextual data in a database of references;

generating a message based on the validation information, the message for use in determining whether to allow the mobile device to interact with an endpoint corresponding to the reference; and transmitting the message to the mobile device.

12. The non-transitory computer-readable medium of claim 11, wherein the message informs a user of the mobile device of a security risk associated with the reference.

13. The non-transitory computer-readable medium of claim 11, wherein captured file is a text file including a link address coded into a QR code.

14. The non-transitory computer-readable medium of claim 11, wherein the validation information regarding the contextual data is based on a determination that a current date is not past an expiration date in the contextual data.

15. The non-transitory computer-readable medium of claim 11, wherein the contextual data is one or more of a logo, a website address, a serial number, a location, or an expiration date.

16. The non-transitory computer-readable medium of claim 11, wherein the contextual data may include a date and time at which the file was captured.

17. The non-transitory computer-readable medium of claim 11, wherein the validation information includes an expiration date for the contextual data.

18. The non-transitory computer-readable medium of claim 11, wherein the network destination is a Universal Record Locator (URL) and the data source is a list having one of approved URLs and rejected URLs.

19. The non-transitory computer-readable medium of claim 11, wherein the captured file is one or more of a video file, a sound file, an image file, or a text file.

20. The non-transitory computer-readable medium of claim 11, wherein the validation information includes merchant information associated with the reference.

* * * * *